(12) United States Patent
Srinivasan et al.

(10) Patent No.: US 12,293,403 B2
(45) Date of Patent: May 6, 2025

(54) CLASSIFICATION OF QUERY TEXT TO GENERATE RELEVANT QUERY RESULTS

(71) Applicant: Target Brands, Inc., Minneapolis, MN (US)

(72) Inventors: Vikram Srinivasan, Karnataka (IN); Srinivasan Seshadri, Los Altos, CA (US); Richard Wang, Sunnyvale, CA (US)

(73) Assignee: Target Brands, Inc., Minneapolis, MN (US)

( * ) Notice: Subject to any disclaimer, the term of this patent is extended or adjusted under 35 U.S.C. 154(b) by 790 days.

(21) Appl. No.: 17/337,183

(22) Filed: Jun. 2, 2021

(65) Prior Publication Data
US 2021/0287277 A1   Sep. 16, 2021

Related U.S. Application Data

(63) Continuation of application No. 16/366,949, filed on Mar. 27, 2019, now Pat. No. 11,055,765.

(51) Int. Cl.
*G06Q 30/00* (2023.01)
*G06F 16/953* (2019.01)
(Continued)

(52) U.S. Cl.
CPC ....... *G06Q 30/0641* (2013.01); *G06F 16/953* (2019.01); *G06F 17/15* (2013.01);
(Continued)

(58) Field of Classification Search
CPC ...................................................... G06Q 30/00
See application file for complete search history.

(56) References Cited

U.S. PATENT DOCUMENTS 6,885,734 B1   4/2005   Eberle et al.
7,624,007 B2   11/2009   Bennett
(Continued)

FOREIGN PATENT DOCUMENTS

KR   10-2008-0008676 A   1/2008

OTHER PUBLICATIONS

Wang et al, "A Short Text Classification Method Based onN-Gram and CNN", Chinese Journal of Electronics, Dated Mar. 2020. (Year: 2020).*
(Continued)

*Primary Examiner* — Mark A Fadok
(74) *Attorney, Agent, or Firm* — Merchant and Gould, PC

(57) ABSTRACT

A service may provide an e-commerce platform through which users may search for, view, and purchase products. To ensure users receive relevant results when querying for particular products or product classes, a list of ranked classes may be generated, from which the query results are based. For example, products may be classified into classes and particular text from search data may be associated with one or more of the products based on click log data. For instance, input text from previously performed queries may be associated with products interacted with following those queries (e.g., products clicked on to view/purchase). Training data that associates the particular text with the respective one or more classes into which the clicked on products are classified may be generated, and in response to receiving a query including the particular text as input, the list of ranked classes may be generated based on the training data.

20 Claims, 11 Drawing Sheets

(51) Int. Cl.
| | |
|---|---|
| *G06F 17/15* | (2006.01) |
| *G06F 18/24* | (2023.01) |
| *G06F 40/30* | (2020.01) |
| *G06N 3/04* | (2023.01) |
| *G06N 3/0464* | (2023.01) |
| *G06N 20/00* | (2019.01) |
| *G06Q 30/0601* | (2023.01) |

(52) U.S. Cl.
CPC .............. *G06F 18/24* (2023.01); *G06F 40/30* (2020.01); *G06N 3/04* (2013.01); *G06N 3/0464* (2023.01); *G06N 20/00* (2019.01); *G06Q 30/0625* (2013.01); *G06Q 30/0633* (2013.01)

(56) References Cited

U.S. PATENT DOCUMENTS

| | | | |
|---|---|---|---|
| 7,970,767 | B2 | 6/2011 | Probst et al. |
| 8,812,509 | B1 | 8/2014 | Pasca et al. |
| 9,785,953 | B2 | 10/2017 | Desal et al. |
| 9,904,874 | B2 | 2/2018 | Shoaib et al. |
| 10,387,436 | B2 | 8/2019 | Tholiya et al. |
| 10,965,708 | B2* | 3/2021 | Kolychev ............... G06N 3/044 |
| 11,392,651 | B1* | 7/2022 | McClusky ............ G06F 40/295 |
| 11,593,700 | B1* | 2/2023 | Ansari ..................... G06N 5/01 |
| 2005/0203790 | A1 | 9/2005 | Cohen |
| 2006/0178868 | A1 | 8/2006 | Billerey-Mosier |
| 2010/0228604 | A1 | 9/2010 | Desai et al. |
| 2012/0253792 | A1 | 10/2012 | Bespalov et al. |
| 2013/0085844 | A1 | 4/2013 | Neystadt et al. |
| 2014/0089134 | A1 | 3/2014 | Linh et al. |
| 2014/0172652 | A1 | 6/2014 | Pobbathi et al. |
| 2014/0229158 | A1 | 8/2014 | Zweig et al. |
| 2015/0310528 | A1 | 10/2015 | Sridhar et al. |
| 2017/0147944 | A1 | 5/2017 | Csurka et al. |
| 2017/0286435 | A1 | 10/2017 | Zeng et al. |
| 2018/0121533 | A1* | 5/2018 | Magnani ................ G06N 3/045 |
| 2018/0225553 | A1* | 8/2018 | Ha ........................ G06Q 10/067 |
| 2018/0365718 | A1 | 12/2018 | Sprecher |
| 2020/0251100 | A1* | 8/2020 | Tan .......................... G06N 3/08 |
| 2021/0383453 | A1* | 12/2021 | Gupta ................ G06Q 30/0631 |

OTHER PUBLICATIONS

Cavnar, William, "N-gram-based Text Categorization", researchgate.net, dated May 2001 (Year: 2001).*

Cao, Shaosheng, "Improving Word Embeddings with Convolutional Feature Learning and Subword Information," 2017, AAAI Conference on Artificial Intelligence (Year: 2017).

International Search Report and Written Opinion for Application No. PCT/US2020/025267 mailed Jul. 13, 2020.

Kushal Dave, "Mining the Peanut Gallery: Opinion Extraction and Semantic Classification of Product Reviews," WWW2003, May 20-24, 2003, Budapest, Hungary (Year: 2003).

* cited by examiner

CLASSIFICATION OF QUERY TEXT TO GENERATE RELEVANT QUERY RESULTS

CROSS-REFERENCE TO RELATED APPLICATIONS

This application is a continuation of U.S. application Ser. No. 16/366,949, filed Mar. 27, 2019, which is hereby incorporated by reference in its entirety herein.

BACKGROUND

As electronic commerce (e-commerce) continues to rapidly develop, services providing e-commerce platforms that enable users to search for, view, and purchase products of an online retailer, among other examples, are under increased pressure to improve efficiency of and user interactivity with the platforms in order to remain competitive. For example, users often do not have the extra time or desire to wade through all the products the online retailer may have to offer. Rather, users want to be able to quickly search for a particular category of products and/or an individual product they are looking for. Moreover, when users are having to wade through products, computing resources may be wasted as users click through the various products. For example, the rendering of graphics and information for products that the users are not interested in takes additional and unnecessary processing. Additionally, when users are having to wade through products, the users likely spend a longer amount of time utilizing the platform which may affect a bandwidth of the platform.

With the large number of e-commerce businesses already in existence and with even more emerging, providing relevant results in response to user queries may be critical to keep users interested in viewing and ultimately purchasing products through a particular service's platform. Additionally, provision of relevant results may be helpful in improving the functionality of the platforms themselves. Nevertheless, when users issue queries for relevant products, the query keywords the user selects may be ambiguous, or may relate to very different classes of items. Accordingly, improvements in techniques employed to determine a user's intent and therefore predict relevant query results are desirable to increase an accuracy of the results provided. It is with respect to these and other general considerations that embodiments have been described.

SUMMARY

In accordance with the present disclosure, the above and other issues are addressed by the following:

In a first aspect, methods of classifying query text to generate relevant query results are disclosed. An example method includes receiving information associated with a plurality of products, classifying each of the plurality of products into one or more classes, receiving user interaction data related to the plurality of products, where the user interaction data includes search data and click log data, and associating particular text from the search data with one or more of the plurality of products based on the click log data. The example method further includes, based on the classification and the association, generating training data that associates the particular text with the respective one or more classes into which the one or more of the plurality of products are classified, and in response to receiving a query comprising the particular text as input, generating a list of ranked classes based on the training data.

In a second aspect, systems for classifying query text to generate relevant query results are disclosed. An example system includes a communication interface receiving data from a plurality of different data sources, and a processor communicatively connected to the communication interface. The system also includes a memory communicatively connected to the processor and communication interface, the memory storing instructions comprising a query text classifier application. When executed by the processor, the application causes the system to receive information associated with a plurality of products, classify each of the plurality of products into one or more classes, receive user interaction data related to the plurality of products, where the user interaction data includes search data and click log data, and associate particular text from the search data with one or more of the plurality of products based on the click log data. The application further causes the system to generate training data that associates the particular text with the respective one or more classes into which the one or more of the plurality of products are classified based on the classification and the association, and generate a list of ranked classes based on the training data in response to receiving a query comprising the particular text as input.

In a third aspect, non-transitory computer readable media with instructions stored thereon for classifying query text to generate relevant query results are disclosed. Example instructions include receiving information associated with a plurality of products, classifying each of the plurality of products into one or more classes, receiving user interaction data related to the plurality of products, where the user interaction data includes search data and click log data, and associating particular text from the search data with one or more of the plurality of products based on the click log data. The example instructions further include generating training data that associates the particular text with the respective one or more classes into which the one or more of the plurality of products are classified based on the classification and the association, generating a list of ranked classes based on the training data in response to receiving a query comprising the particular text as input, and generating query results based on the list of ranked classes.

BRIEF DESCRIPTION OF THE DRAWINGS

Non-limiting and non-exhaustive examples are described with reference to the following figures.

DETAILED DESCRIPTION

Figure 1:
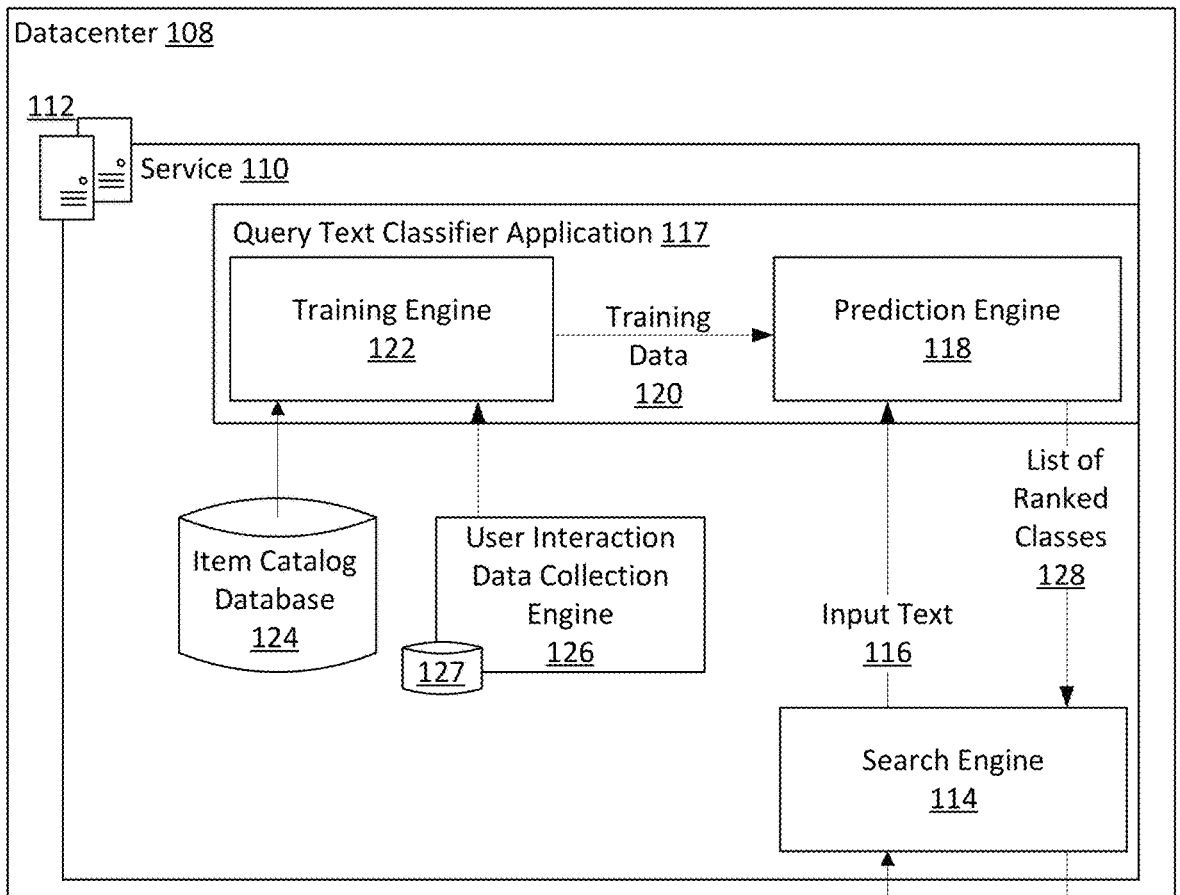
FIG. 1 illustrates an example network environment where a system for classifying query text to generate relevant query results may be implemented.
Figure 1:
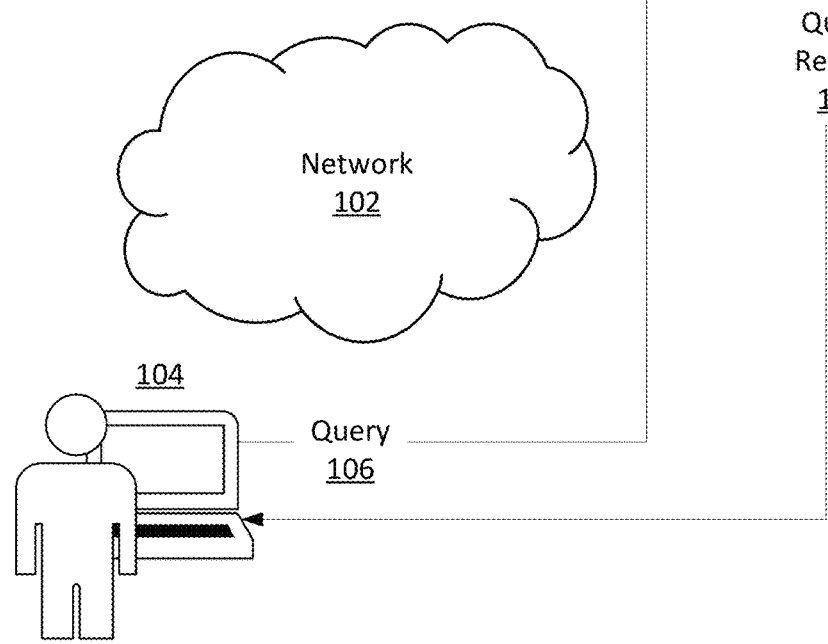

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

As briefly described above, embodiments of the present invention are directed to classification of query text to generate relevant query results. In an example embodiment, a service, such as an online retailer, may provide an e-commerce platform interoperating with one or more applications through which a user may search for, view, and purchase products. To ensure the user receives accurate and relevant results when querying for particular products or classes of products, a list of ranked classes may be generated, from which the query results may be based.

For example, the products may be classified into classes and particular text from search data may be associated with one or more of the products based on click log data. For instance, particular text from previously performed queries may be associated with one or more products interacted with following those previously performed queries (e.g., products clicked on to view and/or purchase). Based on the classification and the association, training data that associates the particular text with the respective one or more classes into which the clicked on products are classified may be generated. Similar associations may be created for each distinct text from the search data to build a robust training data model.

In response to receiving a query including the particular text as input, a list of ranked classes may then be generated based on the training data by implementing a N-gram Convolutional Neural Network (CNN) that analyzes the particular text on multiple N-gram levels to provide a deeper analysis, and thus provide more accurate results. Results to the query may then be generated based on the list, such that products classified into the highest ranked class are displayed first, for example.

Disclosed embodiments provide highly accurate, relevant query results. For example, conventional techniques implementing an N-gram CNN analyze input text based on a single N-gram level. In contrast, the implementation of an N-gram CNN disclosed herein analyzes the input text on multiple N-gram levels enabling additional information to be gleaned from the analysis, which produces more accurate results. For example, by analyzing as many possible combinations of each word or string of words provided in the input text using the multiple N-gram levels versus only analyzing the word or string words as it is presented in the input text, the probability that a determined class and rank of class within the list is correct may be significantly increased. By providing more accurate, relevant results in response to a query, the querying user may be able to more efficiently interact with the results to view and/or select products for purchase, for example. Increased efficiency may encourage the user to continue viewing and purchasing products from the particular service. Additionally, the user may not have to spend as much time on the application clicking through large amounts of irrelevant products, which may reduce an amount of processing resources required and increase bandwidth for the device on which the application is being executed and/or a server or other similar device on which the service or e-commerce platform is run.

FIG. 1 illustrates an example network environment where a system for categorizing input text from a query to generate relevant query results may be implemented.

An example system 100 may include a datacenter 108 hosting a service 110 that provides, among other things, an e-commerce platform. For example, the service 110 may be associated with an online retail store that sells a plurality of products. The datacenter 108 may include one or more processors 112, of which, at least one may be operable to execute one or more components of the service 110, including a query text classifier application 117, discussed herein. In one embodiment, the service 110 may interoperate with various applications to enable a user to search for, view, and purchase the products electronically over a network 102. For example, a user may execute a thin version of an application (e.g., a web browser) or a thick version of the application (e.g., a locally installed application) through a device 104. The device 104 may include a desktop computer, a laptop computer, a tablet computer, a smart phone, or wearable computing device, among other similar devices. The application may provide data related to the service 110, such as a listing of the products available for purchase and options to view and purchase the products via the application, among other examples. A communication interface may facilitate communication between the service 110 and the device 104 over one or more networks, such as the network 102.

A user interface of the application may include a search box and associated search control that allows the user to submit a query 106 to a search engine 114 of the service 110. For example, the user may input text, such as a word, phrase, or sentence, into the search box and select the search control. In response to receiving the query 106, the search engine 114 provides input text 116 from the query 106 to the query text classifier application 117. The query text classifier application 117 may include a prediction engine 118 and a training engine 122. Using the input text 116 as input data, the prediction engine 118 may implement predictive modeling (e.g., an N-gram CNN) to generate a list of ranked classes 128 using training data 120 provided by the training engine 122. The training data 120 may be specific to a particular text and the particular text may match the input text 116 from the query 106.

To generate the training data 120, the training engine 122 may receive information from an item catalog database 124. In one example, the information includes product stock keeping units (SKUs) for the plurality of products sold by the service 110. The training engine 122 may classify each of the products into one or more classes. The classes may include categories of products, facets of products, or SKUs of products, among other examples. To provide an example, high heels, ballet flats, and boots manufactured by a particular designer may be classified into a "shoe" category of products, classified into a "particular designer" facet of products, and/or may be classified individually based on each product's SKU. The products may be associated with the one or more classes into which they are classified through their respective SKUs.

The training engine 122 may then receive user interaction data from a database 127 associated with a user interaction data collection engine 126 of the service 110. The user interaction data collection engine 126 may collect data associated with user interactions with the thin and/or thick versions of the application and store the data within the database 127. For example, when a user searches for and/or selects to view or purchase a product through the application, the user interaction data collection engine 126 collects search data, such as input text of a query entered by a user, and data related to user interactions with results of the query, including user selections to view or purchase the product (i.e., click log data). Accordingly, the user interaction data may include search data and click log data collected by the user interaction data collection engine 126. The search data and click log data may be collected over a predetermined period of time (e.g., 18 months).

The training engine 122 may associate a particular text from the search data with one or more of the plurality of products based on the click log data. For example, for every click made by a user on a product, the input text of the query entered by the user prior to clicking on the product will be collected. The training engine 122 may associate the input text with the clicked on product based on the product's SKU, and aggregate all clicked on products having associations with the same input text. Therefore, for a particular text, you can see a number of times that a first product was clicked on, a number of times a second product was clicked on, etc.

Based on the classification of each of the plurality of products into the one or more classes and the association between the particular text and the one or more of the plurality of products, the training engine 122 may generate the training data 120. The training data 120 may associate the particular text to the respective one or more classes into which the one or more of the plurality of products are classified. Similar associations may be created for each distinct input text from the search data that is collected to build a robust training model.

One or more techniques may be implemented by the training engine 122 to generate the training data 120. The techniques may include a best label per query, a multi-label per query, and a weighted multi-label per query. Implementing the best label per query technique, the particular text may be associated with a single class from the respective one or more classes, where the single class may have a highest class score from among the respective one or more classes. A class score represents a probability of a class being interacted with (e.g., clicked on) given the text of the query and may be calculated by dividing a number of times the particular class has been clicked on in response to previously performed queries containing the text by a number of occurrences of previously performed queries containing the text. Implementing the multi-label per query technique, the particular text may be associated with multiple classes (e.g., each of the respective one or more classes), where the associations may be unweighted. Implementing the weighted multi-label per query technique, the particular text may be associated with multiple classes (e.g., each of the respective one or more classes), where the associations may be weighted based on a class score of each of the classes. Additional details and examples of each technique are provided in conjunction with FIGS. 2, 4, and 7A through 7C, below.

Once the training data 120 is received, the prediction engine 118 may generate the list of ranked classes 128 based on the training data 120. For example, the prediction engine 118 may implement an N-gram CNN to determine classes to be included within the list, where the input text 116 may be analyzed on multiple N-gram levels to glean more information and produce more accurate results, as described in greater detail in conjunction with FIGS. 3 and 4 below. The classes may be then be ranked based on a class score calculated for each class within the list. As previously discussed, using the training data 120, the score for a particular class may be calculated by dividing a number of times the particular class has been clicked on in response to previously performed queries containing the same text (i.e., the input text 116) by a number of occurrences of previously performed queries containing the same text. In an example scenario, the text from the query may be "running shoes" and the generated list of classes includes performance athletic shoes and sneakers. Performance athletic shoes may be ranked first because out of 1,000 times that the query for "running shoes" has occurred, a user has clicked on products classified within performance athletic shoes 800 times to produce a score of 0.8. Sneakers may be ranked second because out of 1,000 times the query for "running shoes" has occurred, a user has clicked on products classified within sneakers 200 times to produce a score of 0.2.

The list of ranked classes 128 may be provided to the search engine 114. Query results 130 may be tailored to correspond to the list of ranked classes 128 to ensure the most accurate, relevant query results 130 are provided to the user. For example, products classified within the highest ranked class within the list may be displayed first within the query results 130. In some embodiments, the prediction engine 118 may generate the query results 130 based on the list of ranked classes 128. The query results 130 may then be provided to the user through the user interface of the application executing on the device 104.

Figure 2:
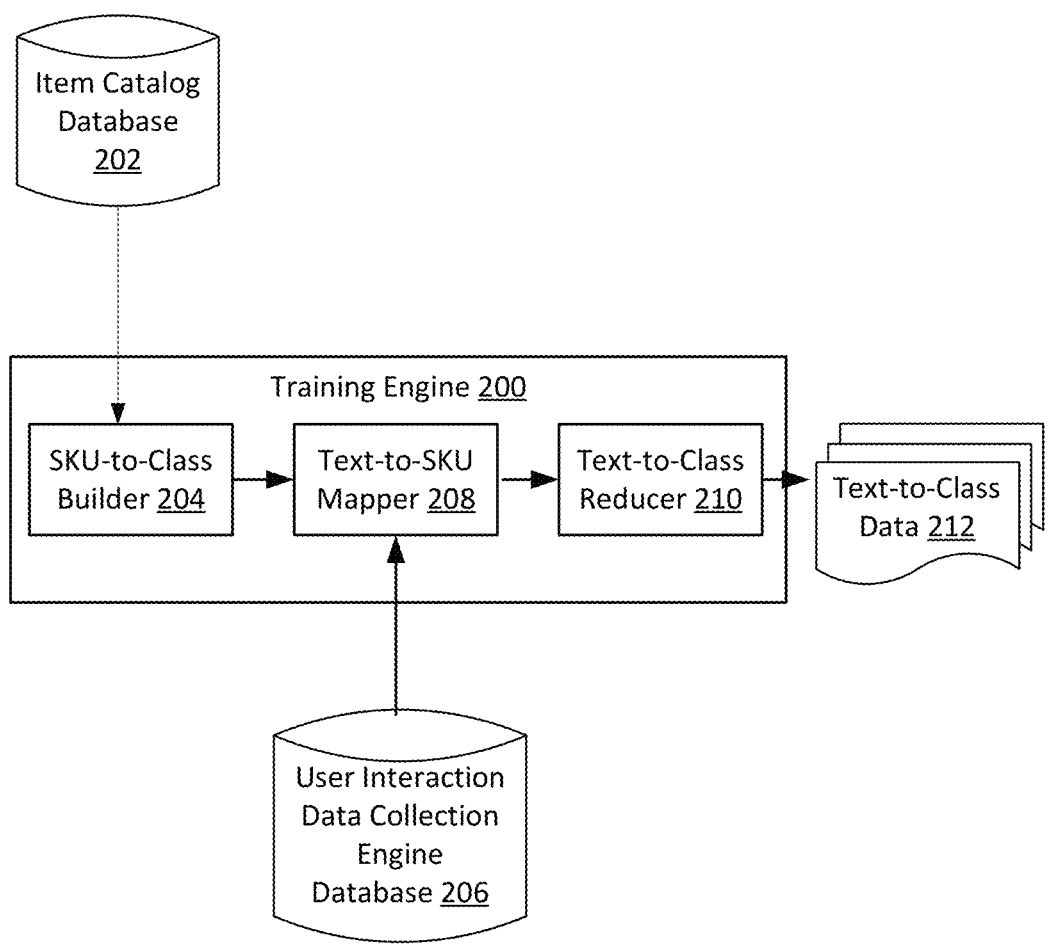
FIG. 2 illustrates an example process for generating training data.

FIG. 2 illustrates an example process for generating training data. A system may comprise a service hosted by a datacenter. The service may provide an e-commerce platform, where the service may be associated with an online retail store that sells a plurality of products, for example. The service may include, among other components, a query text classifier application executed by one or more processors of the datacenter. The query text classifier application may include a training engine 200 for generating training data.

The training engine 200 may receive information, such as product stock keeping units (SKUs) for each of the plurality of products, from an item catalog database 202 associated with the service. The SKU-to-Class builder 204 of the training engine 200 may classify each of the plurality of products into one or more classes. The classes may include categories of products, facets of products, or SKUs of products, among other examples. The products may be associated with the one or more classes into which they are classified through their respective SKUs.

The training engine 200 may then receive user interaction data from a database of a user interaction data collection engine 206. The user interaction data may include search data and click log data collected by the user interaction data collection engine over a predetermined period of time. The Text-to-SKU Mapper 208 of the training engine 200 may associate a particular text from the search data with one or more of the plurality of products based on the click log data. For example, for every click made by a user on a product, the text that the user entered into a search box prior to clicking on the product will be collected. The Text-to-SKU Mapper 208 may associate the text with the clicked on product based on the product's SKU, and aggregate all clicked on products having associations with the same text. Therefore, for a particular text, you can see a number of times that a first product was clicked on, a number of times a second product was clicked on, etc.

Based on the classification of each of the plurality of products into the one or more classes and the association between the particular text and one or more of the plurality of the products, the Text-to-Class Reducer 210 of the training engine 200 may generate the training data. The training data may be comprised of Text-to-Class Data 212 that associates the particular text to respective classes into which the one or more of the plurality of products are classified into. Associations may be created for each distinct text from the search data that is collected using the same techniques discussed above to build a robust training data model.

One or more techniques may be implemented by the training engine 200 to generate the training data. The techniques may include a best label per query, a multi-label per query, and a weighted multi-label per query For example, using the best label per query technique, only a single class associated with a particular text of a query is chosen for each query, and the query is not duplicated in the training data. The single class chosen may be the most prominent class, which is the class with a highest class score. A class score represents a probability of a class being clicked on given the text of the query and may be calculated by dividing a number of times the particular class has been clicked on in response to previously performed queries containing the text by a number of occurrences of previously performed queries containing the text.

Using the multi-label per query technique, multiple classes associated with a particular text of a query may be chosen for each query, where the associations may be unweighted. For example, the particular text of the query may have three associated classes: A, B, and C. In the training data, the query may be duplicated three times, where a first time the query is associated with A, a second time the query is associated with B, and a third time the query is associated with C.

Using the weighted multi-label per query technique, multiple classes associated with a particular text of a query may be chosen for each query, where the associations may be weighted based on a class score of each class. For example, the particular text of the query may have three associated classes: A, B, and C. Each class may have a different class score, as described above. For example, A may have a score of 0.5, B may have a score of 0.2, and C may have a score of 0.1. In the training data, the query may be associated with A and duplicated five times, the query may be associated with B and duplicated two times, and the query may be associated with C with no duplication. If a class, such as A, has a higher class score, the system more strongly believes that the particular class belongs to the given query (e.g., the class would yield relevant results to the query). Therefore, by weighting the associations when generating the training data, queries associated with classes having higher class scores are duplicated a greater number of times to encourage the system to learn the most relevant associations.

Figure 3:
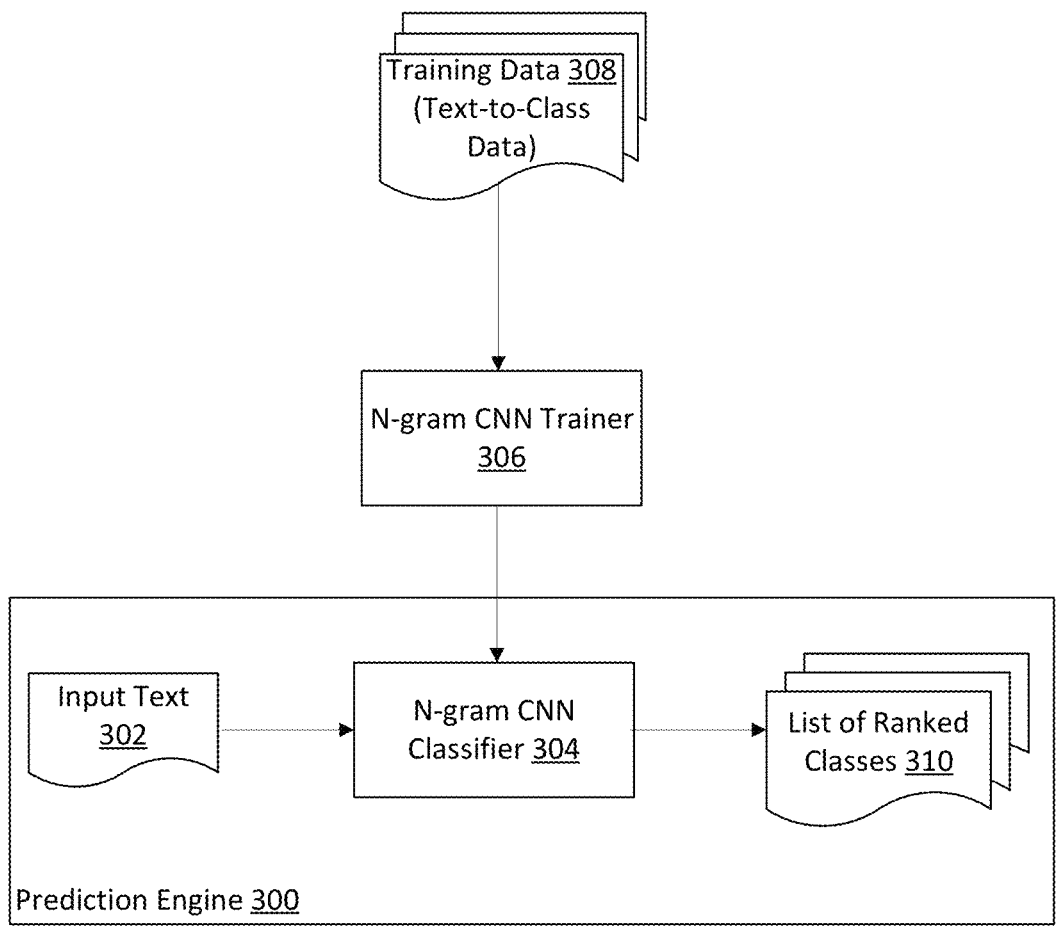
FIG. 3 illustrates an example process for generating a list of ranked classes for a given query based on training data.

FIG. 3 illustrates an example process for generating a list of ranked classes for a given query based on training data. A system may include a service hosted by a datacenter. The service may provide an e-commerce platform, where the service may be associated with an online retail store that sells a plurality of products, for example. The service may include, among other components, a query text classifier application executed by one or more processors of the datacenter. The query text classifier application may include a prediction engine 300 for generating a list of ranked classes 310 for a given query based on training data 308 provided by a training engine of the query text classifier application discussed in conjunction with FIG. 2.

The service may interoperate with various applications to enable a user to search for, view, and purchase products electronically over a network. For example, a user may execute a thin version of an application (e.g., a web browser) or a thick version of the application (e.g., a locally installed application) through a device. A user interface of the application may include a search box and associated search control that allows the user to submit a query to the service. In response to receiving a query, the prediction engine 300 may receive input text 302 from the query. Using the input text 302 as input data, the prediction engine 300 implements predictive modeling to generate the list of ranked classes 310 as output data based on the training data 308, where the training data 308 represents Text-to-Class Data that is specific to a particular text and the particular text matches the input text 302.

For example, the prediction engine 300 may implement an N-gram Convolutional Neural Network (CNN) comprised of an N-gram CNN Trainer 306 and an N-gram CNN Classifier 304 to determine classes to be included within the list. A vector representation of the input text 302 may be generated. One or more N-grams may be built based on the generated vector representation, where each N-gram may be a different size and represent a different combination of words and/or of string words from the input text 302. For example, each N-gram may be a unigram, a bigram, a trigram, a quadgram, or a pentagram. Building more than one N-gram and having a variety of sizes N-grams may allow deeper analysis of the input text 302 to provide more accurate results. Each of the N-grams built may be passed through a convolution layer comprising an activation function that learns a weight matrix for each N-gram and produces output feature vectors for each N-gram. Each of the output feature vectors may be passed through a max pooling layer and an optional dropout layer resulting in the formation of a one-dimensional feature vector. The one-dimensional feature vector may then be passed through a loss layer comprising a softmax function to yield the classes to be included within the list.

The classes within the list may be then be ranked based on a class score. Using the training data 308, the score for a particular class may be calculated by dividing a number of times the particular class has been clicked on in response to previously performed queries containing the same text (i.e., text that is the same as the input text 302) by a number of occurrences of previously performed queries containing the same text.

Figure 4:
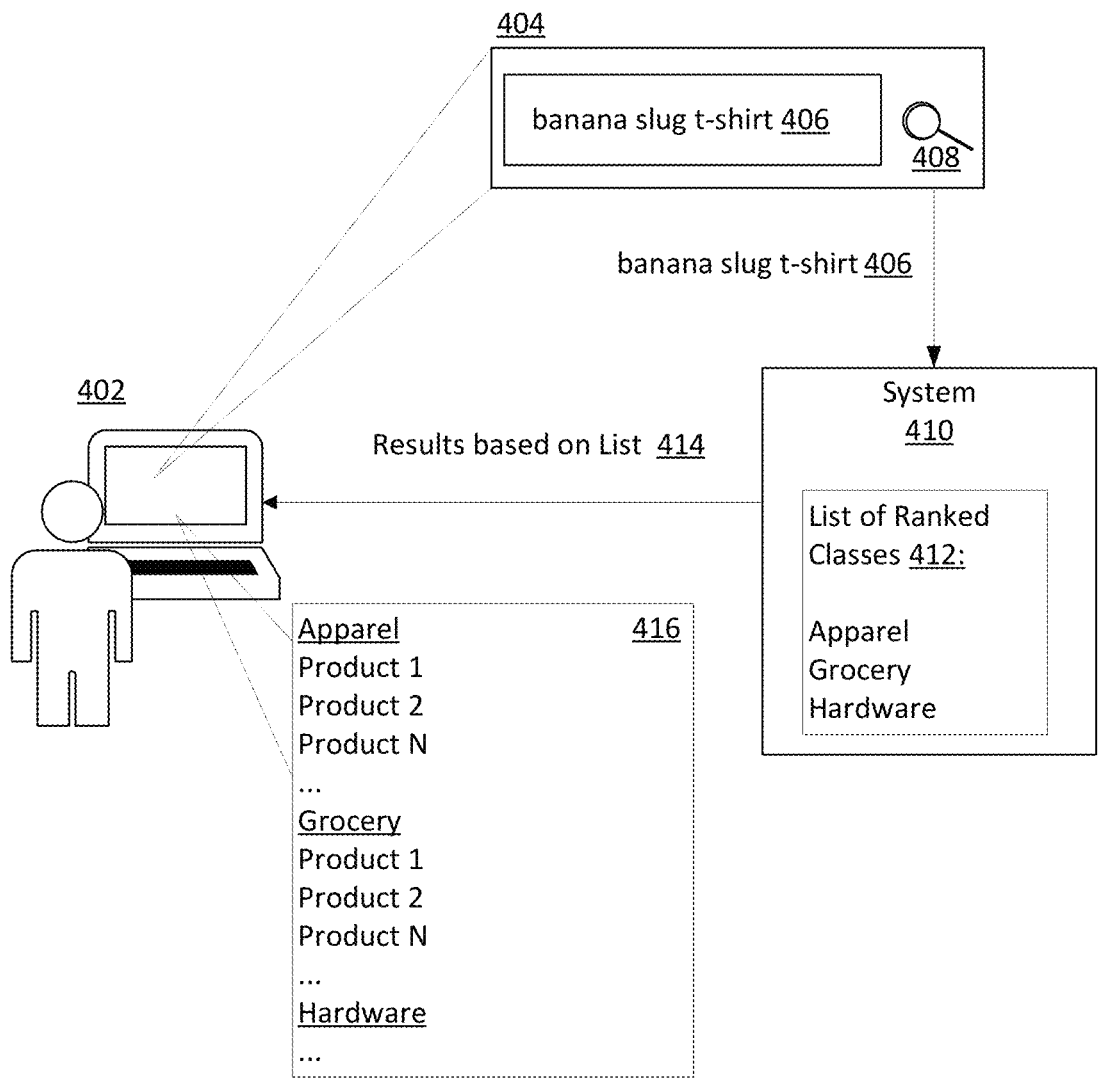
FIG. 4 illustrates example inputs and outputs of a system for classifying query text to generate relevant query results.

FIG. 4 illustrates example inputs and outputs of a system for classifying query text to generate relevant query results. A service may provide an e-commerce platform, interoperating with various applications to enable a user to search for, view, and purchase a plurality of products electronically. For example, a user may execute a thin version of an application (e.g., a web browser) or a thick version of the application (e.g., a locally installed application) through a computing device 402. As shown in a diagram 400, a user interface of the application may include a search box 404 and associated search control 408 that allows the user to submit a query to the service. For example, the user may enter input text, such as the phrase "banana slug t-shirt" 406 into the search box 404 and select the search control 408. The input text may be entered using various input methods, including touch, gesture, stylus, mouse, and/or keyboard inputs.

A system 410 hosting the service may receive the input text "banana slug t-shirt" 406, generate a list of ranked classes 412, and provide results 414 to the user based on the list of ranked classes. For example, a list of products 416 classified into each of the ranked classes may be provided through the user interface of the application on the computing device 402.

The system 410 may use training data to generate the list of ranked classes 412. To generate the training data, the system 410 may classify each of the plurality of products associated with the service into one or more classes, and associate the input text "banana slug t-shirt" 406 with products that were interacted with following previously performed queries comprising the input text "banana slug t-shirt" (e.g., products that were clicked on to view and/or purchase). The training data may be generated based on the classification and the association, where the training data provides an association between the text "banana slug t-shirt" 406 and the one or more classes into which the clicked on products are classified. For example, in previously performed queries where the user input the text "banana slug t-shirt" 406, users may have clicked on t-shirts, bananas, or slugs. Therefore, the training data may provide an association between the text "banana slug t-shirt" 406 and three classes: apparel into which t-shirts are classified, grocery into which bananas are classified, and hardware into which slugs are classified. The training data may be able to, for example, identifier a most likely category of interest based on the manner in which the query is constructed.

One or more techniques may be implemented by the system 410 to generate the training data. The techniques may include a best label per query, a multi-label per query, and a weighted multi-label per query. For example, using the best label per query technique, only a single class associated with a particular text of a query is chosen for each query, and the query is not duplicated in the training data. The single class chosen may be the most prominent class, which is the class with a highest class score. A class score represents a probability of a class being clicked on given the text of the query and may be calculated by dividing a number of times the particular class has been clicked on in response to previously performed queries containing the text by a number of occurrences of previously performed queries containing the text. In the example provided, the most prominent class may be apparel because users in the past more often clicked on a product within the apparel class after entering the text "banana slug t-shirt" 406 or variations thereof into the search box 404. Therefore, in the training data, the query is only associated with the apparel class, and the query is not duplicated.

Using the multi-label per query technique, multiple classes associated with a particular text of a query may be chosen for each query, where the associations may be unweighted. In the example provided, the text "banana slug t-shirt" 406 is associated with each of the three classes: apparel, grocery, and hardware. In the training data, the query may be duplicated three times, where a first time the query is associated with apparel, a second time the query is associated with grocery, and a third time the query is associated with hardware.

Using the weighted multi-label per query technique, multiple classes associated with a particular text of a query may be chosen for each query, where the associations may be weighted based on a score of each class. In the example provided, the text "banana slug t-shirt" 406 is associated with each of the three classes: apparel, grocery, and hardware. Each class may have a class score, as described above. For example, apparel may have a score of 0.5, grocery may have a score of 0.2, and hardware may have a score of 0.1. In the training data, the query may be associated with apparel and duplicated five times, the query may be associated with grocery and duplicated two times, and the query may be associated with hardware with no duplication.

The system 410 may use the training data in conjunction with an N-gram convolutional neural network (CNN) to generate the list of ranked classes 412. The classes within the list may include apparel, grocery, and hardware. Each of the classes in the list may be ranked based on class score. In the provided example, apparel may have the highest score and be the highest ranked class because there is a greater probability that a user will click on a product within the apparel category in response to entering text "banana slug t-shirt" into the search box 404. Grocery may be the next highest ranked class followed by hardware. The system 410 may provide the results 414 based on the list to the computing device 402 for display through the user interface of the application. For example, the results provided through the user interface (e.g., the list of products 416) may list products that are classified into the highest ranked classes first followed by products classified into lower ranked classes. Therefore, in the example provided, products classified into the apparel class may be displayed before products classified into grocery or hardware classes.

Figure 5:
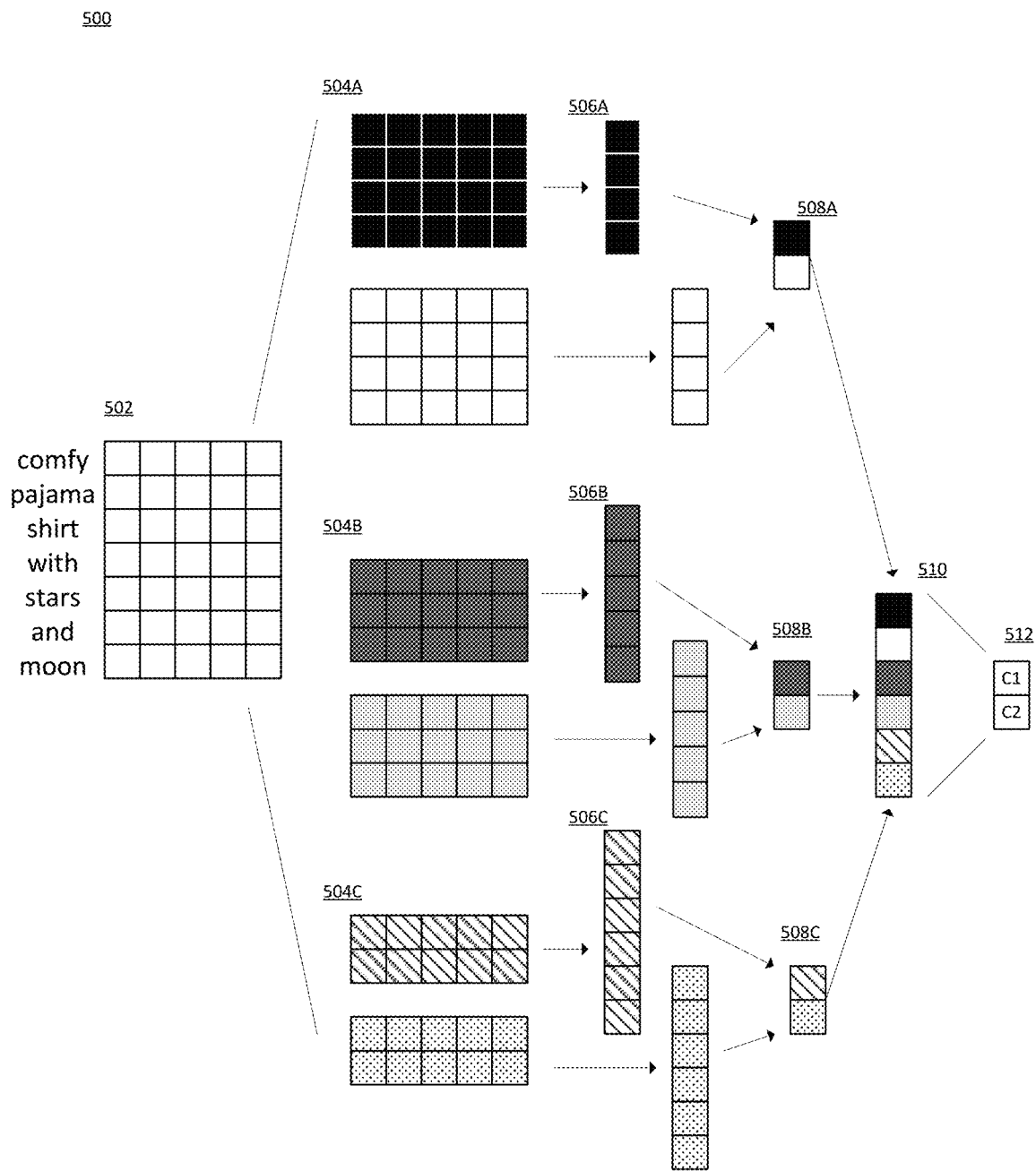
FIG. 5 provides a conceptual illustration of analysis performed by an N-gram convolutional neural network (CNN).

FIG. 5 illustrates a conceptual illustration of an N-gram convolutional neural network (CNN). As illustrated in a diagram 500, in response to receiving a query comprising input text, an N-gram CNN may be implemented to generate a list of classes from which relevant query results may be generated. To provide an example scenario, a user may submit a query by entering text into a search box and selecting a search control provided via an application or website through which an online retail store, among other examples, may list and/or sell their products. For example, the user may enter the phrase, "comfy pajama shirt with stars and moon" into the search box and select the search control. This phrase serves as an input for the N-gram CNN. A vector representation of the phrase (e.g., an embedding vector 502) may be generated. N-grams 504A, 504B, and 504C of the query may then be built, where each N-gram may be a different size and represent a different combination of words and/or of string words from the phrase entered by the user. For example, the N-gram may be a quadgram as illustrated in 504A, a trigram as illustrated in 504B, and a bi-gram as illustrated in 504A. In other examples, the N-gram may be a unigram or a pentagram. Building more than one N-gram and having a variety of sizes N-grams may allow deeper analysis of the phrase to provide more accurate results. For example, by analyzing as many possible combinations of each word or string of words from the phrase using the multiple N-gram levels, a probability that a determined class and rank of class within the list is correct may be significantly increased.

Each of the N-grams 504A, 504B, and 504C may pass through a convolution layer comprising an activation function. The activation function learns a weight matrix 506A, 506B, and 506 C to produce output feature vectors 508A, 508B, and 508C for the respective N-grams 504A, 504B, and 504C. Each of the output feature vectors 508A, 508B, and 508C may pass through a max pooling layer and an optional dropout layer resulting in the formation of a one-dimensional feature vector 510. The one-dimensional feature vector 510 may then be passed through a loss layer comprising a softmax function to yield classes 512 to be included in the list.

Figure 6:
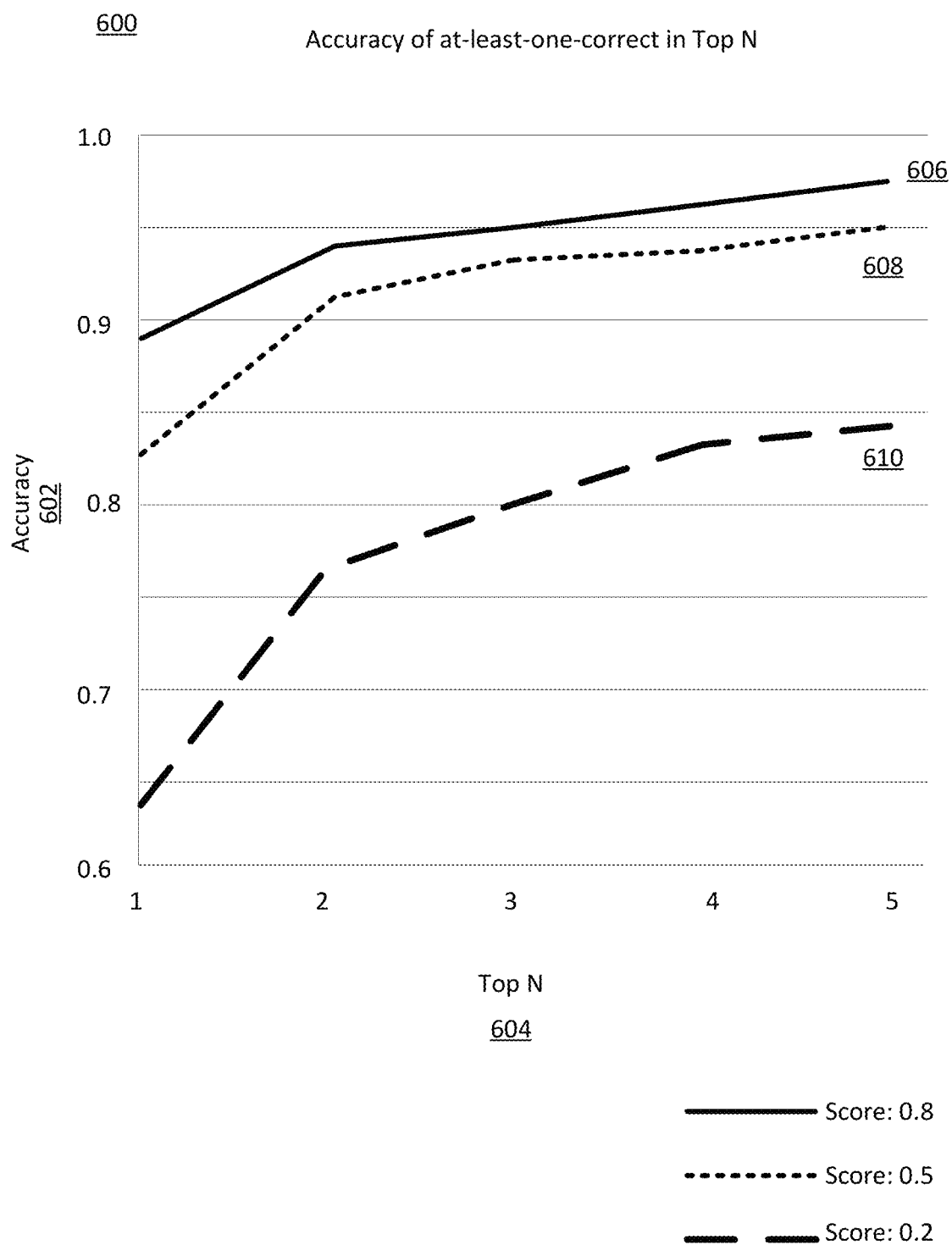
FIG. 6 provides a graph demonstrating an accuracy of a generated list of ranked classes.

FIG. 6 provides a graph demonstrating an accuracy of a generated list of ranked classes. For example, a line graph 600 illustrates accuracy based on there being at least one correct class in the top N classes determined to be included within the list of ranked classes. The y-axis 602 represents accuracy on a scale from 0 to 1. The x-axis 604 represents the Top N, where N is the top number of classes (i.e., the highest ranked classes) within the generated list.

To provide an example, when N=3, if any one of the top three classes in the list is correct, then the accuracy is recorded as 1. If none of the top three classes in the list is correct, then the accuracy is recorded as 0. The accuracy of all the queries that have been tested are averaged to produce the line graph 600.

As N increases, the accuracy also increases because there is a greater probability of getting at least one class correct when a greater number of top classes are provided. Additionally, class score thresholds may affect accuracy. As previously discussed, the score for a particular class may be calculated by dividing a number of times the particular class has been clicked on in response to previously performed queries containing a particular text by a number of occurrences of previously performed queries containing the particular text. Therefore, as illustrated by line 1 606, if a particular class has a score of 0.8, meaning the system highly believes that the particular class belongs to the given query, the accuracy is high and relatively stable regardless of whether N is 1 or 6. In contrast, as illustrated by line 3 610, if a particular class has a score of 0.2, meaning that the system may not strongly believe the particular class belongs to the given query but wants to associate as many classes as possible with the given query for higher recall, the accuracy is much lower and varies greatly dependent on whether N is 1 vs. 3 vs. 6. If the score for a particular class is 0.5, as illustrated by line 2 608, the accuracy may fall between but lie closer to the accuracy when the class score is 0.8.

Figure 7A:
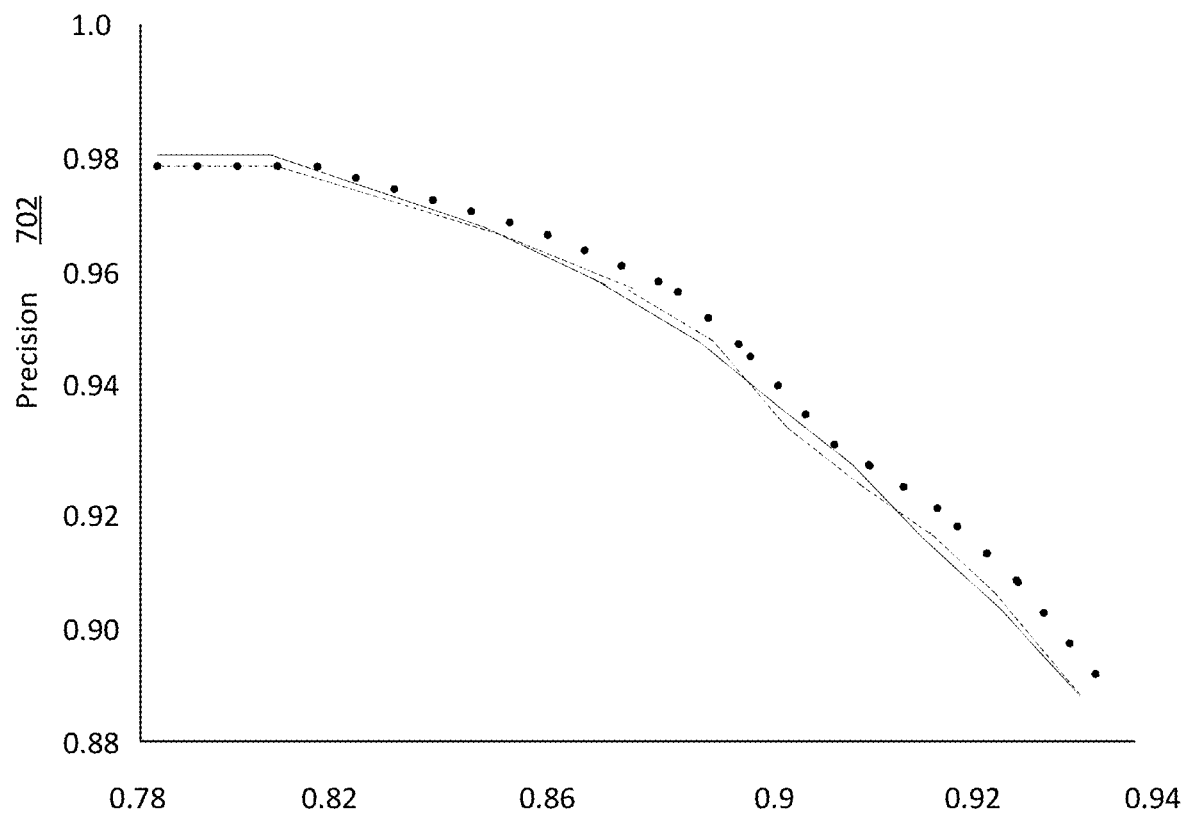
FIGS. 7A, 7B, and 7C provide graphs demonstrating precision recall curves for training data based on a chosen class score threshold and a technique by which the training data is generated.
Figure 7B:
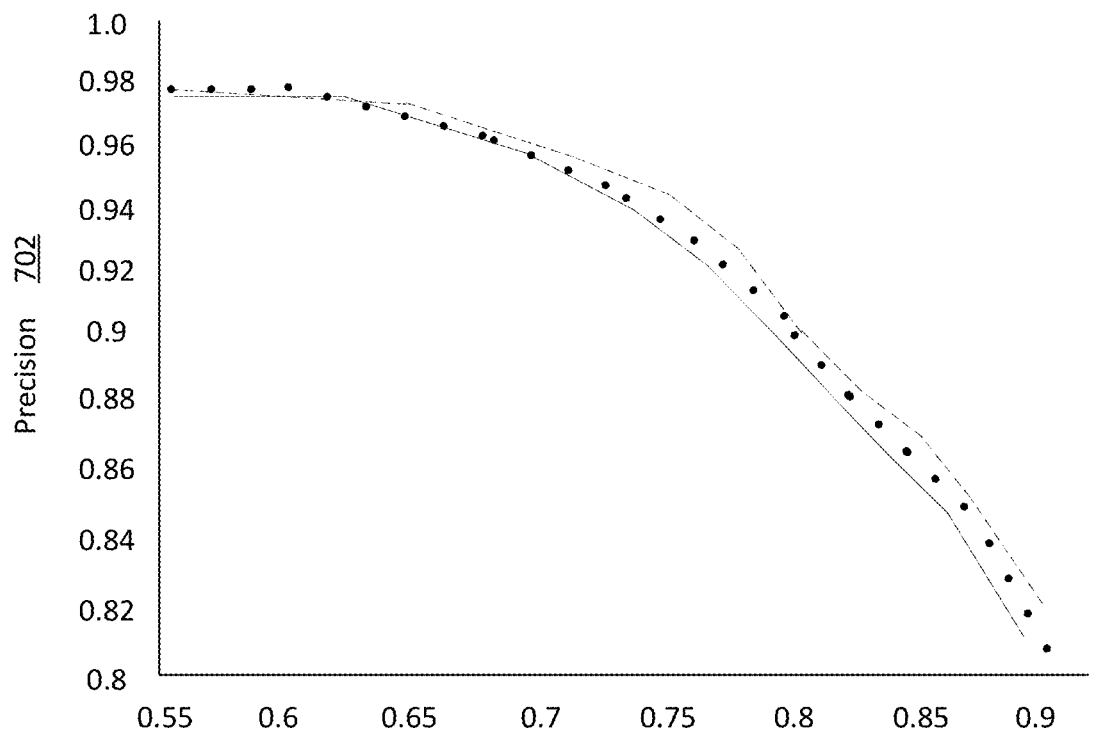
Figure 7C:
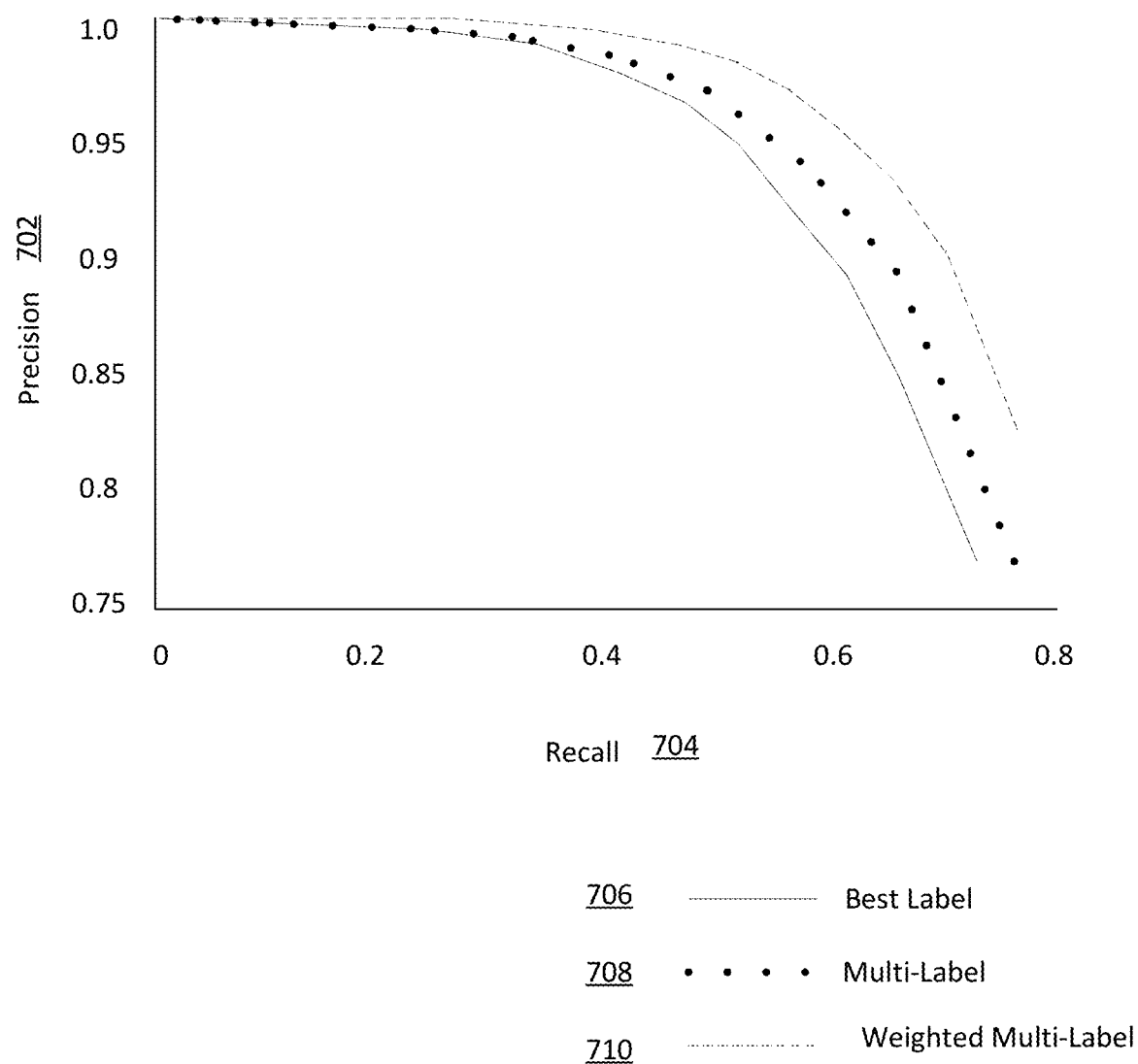

FIG. 7A through 7C provide graphs demonstrating precision recall curves for training data based on a chosen class score threshold and a technique by which the training data is generated. As illustrated in each graph 700A, 700B, and 700C, a y-axis 702 of the graph represents precision while the x-axis 704 of the graph represents recall, producing a precision recall curve. Precision may be defined as a correct number of system outputs divided by a total number of system outputs. Recall may be defined as a correct number of system outputs divided by a true number of labels, where the labels are the classes into which products may be classified.

There may be at least three different techniques for generating the training data: best label 706, multi-label 708, and weighted multi-label 710. If the best label 706 is implemented, a single, most prominent class associated with a text of a query (i.e., a class with a highest class score) may be chosen for each query. The class score represents a probability of a class being clicked on given the text of the query. For example, the class score may be calculated by dividing a number of times the particular class has been clicked on in response to previously performed queries containing the text by a number of occurrences of previously performed queries containing the text. Thus, for each query, the query is associated with only one class, and the query is not duplicated in the training data. If the multi-label 708 is implemented, multiple classes associated with a text of a query may be chosen for each query, where the associations may be unweighted. For example, the text of the query may have three associated classes: A, B, and C. In the training data, the query may be duplicated three times, where a first time the query is associated with A, a second time the query is associated with B, and a third time the query is associated with C. If the weighted multi-label 710 is implemented, multiple classes associated with a text of a query may be chosen for each query, where the associations may be weighted based on a class score for each class. For example, the text of the query may have three classes associated with the query: A, B, and C. Each class may have a different class score, calculated in the manner described above with regard to best label 706. For example, A may have a score of 0.5, B may have a score of 0.2, and C may have a score of 0.1. In the training data, the query may be associated with A and duplicated five times, the query may be associated with B and duplicated two times, and the query may be associated with C with no duplication.

As illustrated in graph 700A, when a class score threshold of 0.8 is chosen, there is not much differentiation between the precision recall curves for each of the techniques 706, 708, and 710. However, differentiations among the precision recall curves for each of the techniques 706, 708, and 710 increase as the class score threshold decreases, as illustrated in graph 700B when a class score threshold of 0.5 is chosen and 700C when a class score threshold of 0.2 is chosen.

Precision and recall work against one another. Thus, if precision is very high, recall may be very low. However, sometimes it may be desirable to balance precision with recall to get maximum coverage and accuracy. For example, a desirable balance may occur when both precision and recall are above 90%, as illustrated in graph 700A when the class score threshold of 0.8 is chosen.

The examples provided in FIGS. 1 through 7C are illustrated with specific systems, services, applications, devices, processes, and demonstrative graphs. Embodiments are not limited to environments according to these examples. Classification of query text to generate relevant query results may be implemented in environments employing fewer or additional systems, services, applications, devices, and processes. Furthermore, the example systems, services, applications, devices, processes, and demonstrative graphs shown in FIGS. 1 through 7C may be implemented in a similar manner with other values using the principles described herein.

Figure 8:
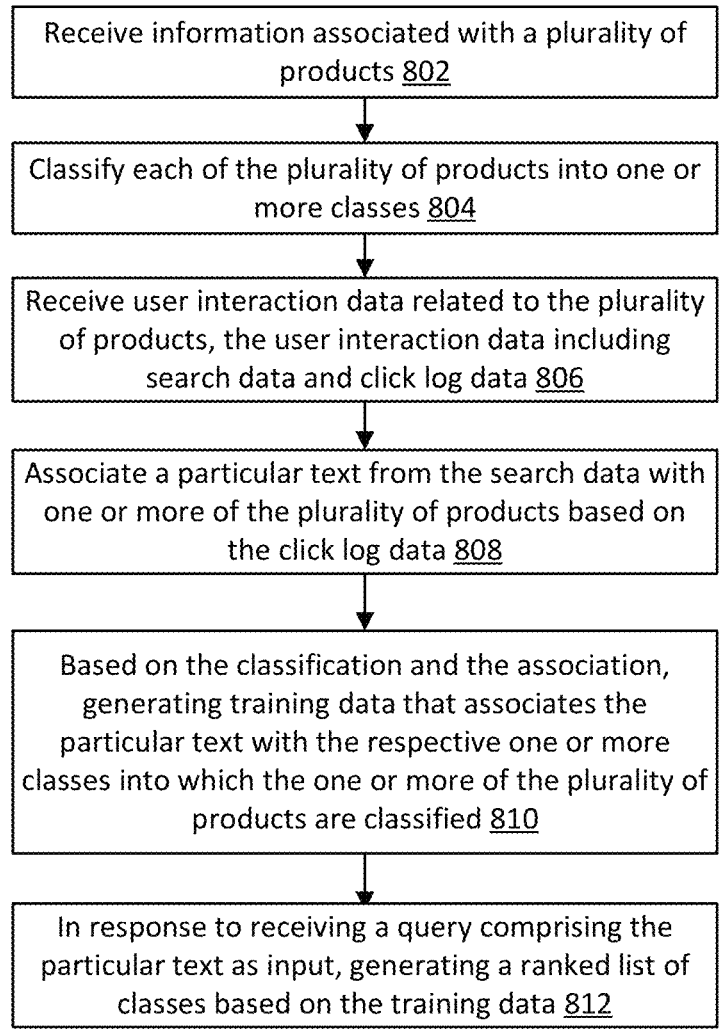
FIG. 8 illustrates an example method of classifying query text to generate relevant query results.

FIG. 8 illustrates an example method of classifying query text to generate relevant query results. At operation 802, information associated with a plurality of products may be received. The information may be received from an item catalog database of a service with which the plurality of products are associated. The information may include SKUs for each of the plurality of products.

At operation 804, each of the plurality of products may be classified into one or more classes. The classes may include categories of products, facets of products, and/or the individual products based on their respective SKUs. At operation 806, user interaction data related to the plurality of products may be received, where the user interaction data may include search data and click log data. For example, the search data and click log data may be received from a user interaction data collection engine of the service with which the plurality of products are associated. The search data may include text entered by the user for a given query and the click log data may include information related to how the user interacted with results of the given query, such as whether the user clicked on a product to view and/or purchase the product.

At operation 808, a particular text from the search data may be associated with one or more of the plurality of products based on the click log data. For example, each of the plurality of products that has been clicked on following a query comprising the particular text may be determined and aggregated such that the particular text may be associated with those one or more of the plurality of products.

At operation 810, based on the classification and the association, the training engine may generate training data that associates the particular text with the respective one or more classes into which the one or more of the plurality of products are classified. The training data may be generated using at least one of three techniques: a best label per query, a multi-label per query, and a weighted multi-label per query. Implementing the best label per query technique, the particular text may be associated with a single class from the respective one or more classes, the single class having a highest class score from among the respective one or more classes. Implementing the multi-label per query technique, the particular text may be associated with each of the respective one or more classes, wherein the association is unweighted. Implementing the weighted multi-label per query technique, the particular text may be associated with each of the respective one or more classes, where the associations may be weighted based on a class score.

At operation 812, in response to receiving a query comprising the particular text as input, a list of ranked classes may be generated based on the training data. For example, an N-gram CNN may be implemented to determine classes to be included within the list. The classes may then be ranked within the list by calculating a class score for each class within the list based on the training data.

The operations 802 to 812 are included for illustration purposes. Classification of query text to generate relevant query results may be implemented by similar processes with fewer or additional operations, as well as in different order of operations using the principles described herein. The operations described herein may be executed by one or more processors operated on one or more computing devices, one or more processor cores, and/or specialized processing devices, among other examples.

Figure 9:
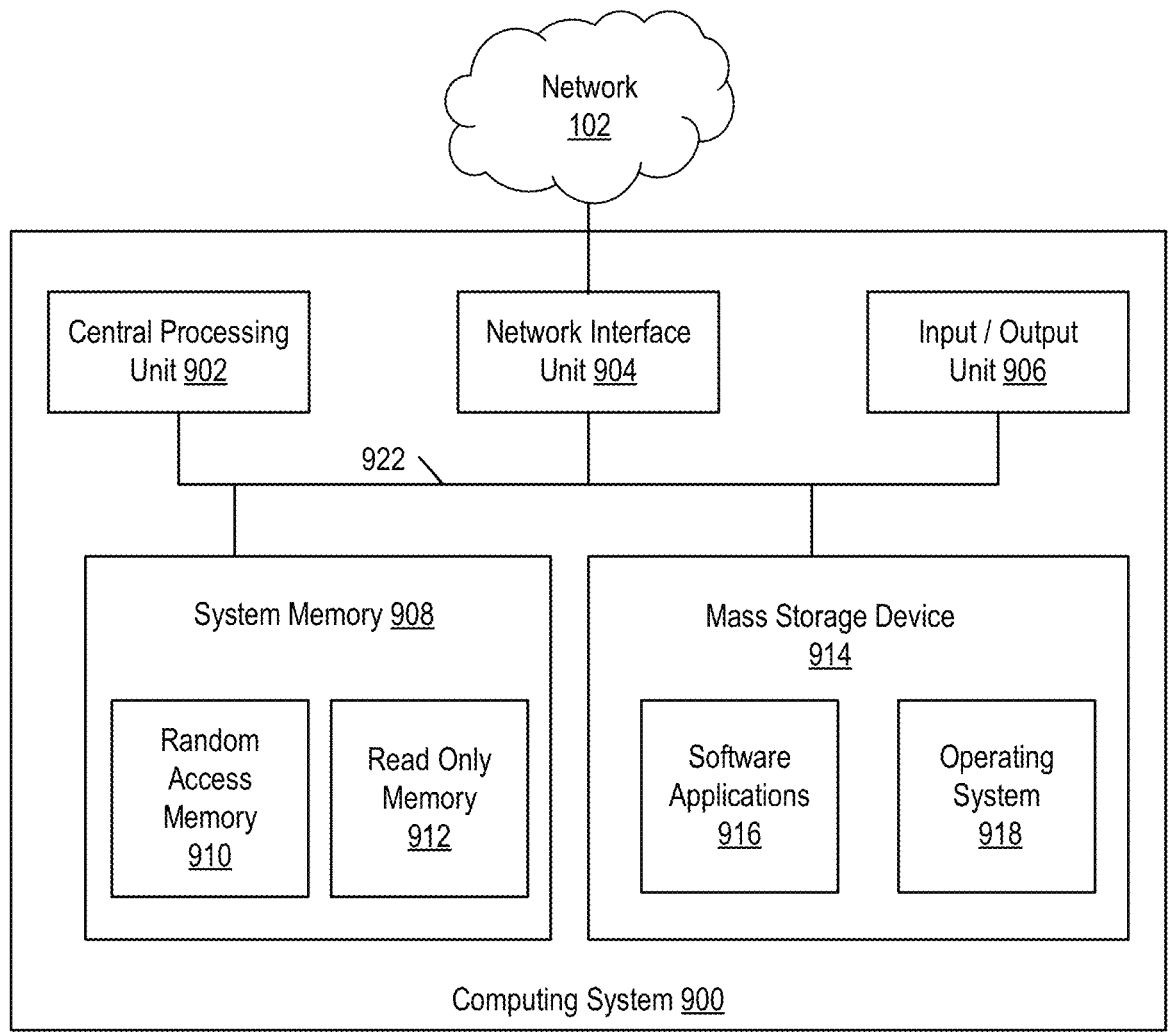
FIG. 9 illustrates an example block diagram of a computing system.

FIG. 9 illustrates an example block diagram of a computing system 900. One or more aspects of the computing system 900 can be used to implement the service 110, one or more components of the service 110 including the search engine 114, the query text classifier application 117 comprising the prediction engine 118 and the training engine 122, and the user interaction data collection engine 126, among other devices or components of the system 100.

In the embodiment shown, the computing system 900 includes at least one CPU (Central Processing Unit) 902, a system memory 908, and a system bus 922 that couples the system memory 908 to the CPU 902. The system memory 908 includes RAM (Random Access Memory) 910 and ROM (Read-Only Memory) 912. A basic input/output system that contains the basic routines that help to transfer information between elements within the computing system 900, such as during startup, is stored in the ROM 912. The computing system 900 further includes a mass storage device 914. The mass storage device 914 is able to store software instructions and data. In many examples, the one or more processors 112 are each implemented as the at least one CPU 902.

The mass storage device 914 is connected to the CPU 902 through a mass storage controller (not shown) connected to the system bus 922. The mass storage device 914 and its associated computer-readable data storage media provide non-volatile, non-transitory storage for the computing system 900. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 900.

According to various embodiments of the invention, the computing system 900 may operate in a networked environment using logical connections to remote network devices through the network 102. The computing system 900 may connect to the network 102 through a network interface unit 904 connected to the system bus 922. It should be appreciated that the network interface unit 904 may also be utilized to connect to other types of networks and remote computing systems. The computing system 900 also includes an input/output controller 906 for receiving and processing input from a number of other devices, including a touch user interface display screen, or another type of input device. Similarly, the input/output controller 906 may provide output to a touch user interface display screen or other type of output device.

As mentioned briefly above, the mass storage device 914 and the RAM 910 of the computing system 900 can store software instructions and data. The software instructions include an operating system 918 suitable for controlling the operation of the computing system 900. The mass storage device 914 and/or the RAM 910 also store software instructions, that when executed by the CPU 902, cause one or more of the systems, devices, or components described herein to provide functionality described herein. For example, the mass storage device 914 and/or the RAM 910 can store software instructions that, when executed by the CPU 902, cause the computing system 900 to receive and execute managing network access control and build system processes.

According to some embodiments, methods of classifying query text to generate relevant query results are disclosed. An example method includes receiving information associated with a plurality of products, classifying each of the plurality of products into one or more classes, receiving user interaction data related to the plurality of products that includes search data and click log data, and associating particular text from the search data with one or more of the plurality of products based on the click log data. The example method further includes, based on the classification and the association, generating training data that associates the particular text with the respective one or more classes into which the one or more of the plurality of products are classified, and in response to receiving a query comprising the particular text as input, generating a list of ranked classes based on the training data.

In other embodiments, query results may be generated based on the list of ranked classes. The particular text may be associated with a single class from the respective one or more classes to generate the training data, where the single class may have a highest class score from among the respective one or more classes, The particular text may be associated with each of the respective one or more classes to generate the training data, where the association is unweighted. The particular text may be associated with each of the respective one or more classes, wherein the association may be weighted based on a class score.

In further embodiments, an N-gram convolutional neural network may be implemented to determine classes to be included within the list by generating a vector representation of the particular text received as input for the query, building one or more N-grams based on the vector representation, passing each N-gram through a convolution layer comprising an activation function, where the activation function learns a weight matrix of each N-gram and produces an output feature vector for each N-gram, passing the output feature vector for each N-gram through a max pooling layer to form a one-dimensional feature vector, and passing the one-dimensional feature vector through a loss layer comprising a softmax function to yield the classes to be included within the list. The one or more N-grams may be a unigram, a bigram, a trigram, a quadgram, or a pentagram.

In yet further embodiments, a class score may be calculated for each class within the list based on the training data, and the classes may be ranked within the list based on the class score. To associate particular text from the search data with one or more of the plurality of products based on the click log data, one or more of the plurality of products that have been clicked on following a query comprising the particular text may be determined and aggregated such that the particular text may be associated with the one or more of the plurality of products. Each of the plurality of products may be classified into one or more of categories of products, facets of products, and stock keeping units (SKUs) of products.

According to some examples, systems for classifying query text to generate relevant query results are disclosed. An example system includes a communication interface receiving data from a plurality of different data sources, and a processor communicatively connected to the communication interface. The system also includes a memory communicatively connected to the processor and communication interface, the memory storing instructions comprising a query text classifier application. When executed by the processor, the application causes the system to receive information associated with a plurality of products, classify each of the plurality of products into one or more classes, receive user interaction data related to the plurality of products that includes search data and click log data, and associate particular text from the search data with one or more of the plurality of products based on the click log data. The application further causes the system to generate training data that associates the particular text with the respective one or more classes into which the one or more of the plurality of products are classified based on the classification and the association, and generate a list of ranked classes based on the training data in response to receiving a query comprising the particular text as input.

In other examples, the application further executes to generate query results based on the list of ranked classes, where products from among the plurality of products classified into a highest ranked class within the list may be displayed first in the query results, and provide the query results to a client device for display through the communication interface. The application further executes to at least one of associate the particular text with a single class from the respective one or more classes, the single class having a highest class score from among the respective one or more classes, associate the particular text with each of the respective one or more classes, where the association is unweighted, and associate the particular text with each of the respective one or more classes, wherein the association is weighted based on a class score.

In further examples, the application further executes to implement an N-gram convolutional neural network to determine classes to be included within the list, calculate a class score for each class within the list based on the training data, and rank the classes within the list based on the class score. The system may host a service providing an electronic commerce (e-commerce) platform, and the plurality of products may be associated with the service. The plurality of different data sources may include at least an item catalog database associated with the service from which the information associated with the plurality of products is received and a user interaction data collection database associated with the service from which the user interaction data is received.

According to some embodiments, non-transitory computer readable media with instructions stored thereon for classifying query text to generate relevant query results are disclosed. Example instructions include receiving information associated with a plurality of products, classifying each of the plurality of products into one or more classes, receiving user interaction data related to the plurality of products that includes search data and click log data, and associating particular text from the search data with one or more of the plurality of products based on the click log data. The example instructions further include generating training data that associates the particular text with the respective one or more classes into which the one or more of the plurality of products are classified based on the classification and the association, generating a list of ranked classes based on the training data in response to receiving a query comprising the particular text as input, and generating query results based on the list of ranked classes. In other embodiments, the one or more classes include categories of products, facets of products, and stock keeping units (SKUs) of products.

Embodiments of the present disclosure can be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The present disclosure is not to be limited in terms of the particular embodiments described in this application, which are intended as illustrations of various aspects. Many modifications and variations can be made without departing from its spirit and scope. Functionally equivalent methods and systems within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only, and is not intended to be limiting.

The above specification, examples and data provide a complete description of the use of the invention. Since many embodiments of the invention can be made without departing from the spirit and scope of the invention, the invention resides in the claims hereinafter appended.

The invention claimed is:

1. A method of classifying text, the method comprising:
identifying a plurality of classes;
receiving user interaction data associated with a particular text;
associating the particular text with at least one of the plurality of classes based on the user interaction data;
generating text-to-class data based on the association;
providing the text-to-class data as training data to an N-gram convolutional neural network; and
in response to receiving new text for classification, providing the new text as input to the N-gram convolutional neural network to generate a subset of classes from the plurality of classes for classifying the new text, the N-gram convolutional neural network building a plurality of N-grams comprised of multiple N-gram levels to analyze the new text using the multiple N-gram levels in conjunction with the training data to output the subset of classes.

2. The method of claim 1, wherein the subset of classes includes more than one of the plurality of classes and the method further comprises:
ranking classes within the subset based on the training data.

3. The method of claim 2, wherein ranking the classes within the subset comprises:
calculating a class score for each class within the subset based on the training data; and
ranking the classes within the subset based on the class score.

4. The method of claim 1, wherein the plurality of N-grams comprised of the multiple N-gram levels built by the N-gram convolutional neural network include N-grams of at least two different N-gram sizes.

5. The method of claim 1, wherein the new text is comprised of a plurality of words, and each N-gram built by the N-gram convolutional neural network represents a different combination of one or more words from the plurality of words.

6. The method of claim 1, wherein the new text received for classification and provided as input to the N-gram convolutional neural network is search query text, and the method further comprises:
generating search query results based on the subset of classes generated and output by the N-gram convolutional neural network.

7. A system for classifying text, the system comprising:
an N-gram convolutional neural network;
a processor; and
a memory communicatively connected to the processor, the memory storing instructions that, when executed by the processor, cause the system to:
identify a plurality of classes;
receive user interaction data associated with a particular text;
associate the particular text with at least one of the plurality of classes based on the user interaction data;
generate text-to-class data based on the association;
provide the text-to-class data as training data to the N-gram convolutional neural network; and
in response to receiving new text for classification:
provide the new text as input to the N-gram convolutional neural network to generate a subset of classes from the plurality of classes for classifying the text, the N-gram convolutional neural network building a plurality of N-grams comprised of multiple N-gram levels to analyze the new text using the multiple N-gram levels in conjunction with the training data to output the subset of classes; and
rank classes within the subset based on the training data.

8. The system of claim 7, wherein:
the user interaction data associated with the particular text includes search data comprising a search query that includes the particular text and click log data associated with one or more of a plurality of products clicked on following the search query;
each of the one or more of the plurality of products are classified into one or more of the plurality of classes; and
to associate the particular text with at least one of the plurality of classes based on the user interaction data, the system is caused to associate the particular text with the one or more of the plurality of classes into which each of the one or more of the plurality of products are classified.

9. The system of claim 8, wherein to generate the text-to-class data based on the association, the system is caused to one of:
associate the particular text with a single class from the one or more of the plurality of classes into which each of the one or more of the plurality of products are classified, the single class having a highest class score from among the one or more of the plurality of classes;
associate the particular text with each of the one or more of the plurality of classes into which each of the one or more of the plurality of products are classified, wherein the association is unweighted; and
associate the particular text with each of the one or more of the plurality of classes into which each of the one or more of the plurality of products are classified, wherein the association is weighted based on a class score.

10. The system of claim 8, wherein the new text received for classification and provided as input to the N-gram convolutional neural network is search query text associated with the plurality of products, and the system is further caused to generate and provide for display search query results based on the ranked classes within the subset.

11. The system of claim 10, wherein one or more of the plurality of products responsive to the search query text and classified into a highest ranked class within the subset are displayed first in the search query results.

12. The system of claim 7, wherein the plurality of N-grams comprised of the multiple N-gram levels built by the N-gram convolutional neural network include N-grams of at least two different N-gram sizes.

13. The system of claim 7, wherein the new text is comprised of a plurality of words and each N-gram built by the N-gram convolutional neural network represents a different word or combination of words from the plurality of words.

14. A method of classifying text, the method comprising:
receiving, at a convolutional neural network, training data generated based on associations of particular text with one or more of a plurality of classes;
receiving new text for classification as input to the convolutional neural network;
building a plurality of N-grams comprised of multiple N-gram levels based on the new text;
analyzing the new text using the multiple N-gram levels in conjunction with the training data to generate a subset of classes from the plurality of classes for classifying the new text; and
providing the subset of classes as output of the convolutional neural network.

15. The method of claim 14, wherein the training data received includes text-to-class data, and the text-to-class data is generated by:
identifying the plurality of classes;
receiving user interaction data associated with the particular text;
associating the particular text with at least one of the plurality of classes based on the user interaction data; and
generating the text-to-class data based on the association.

16. The method of claim 14, wherein the plurality of N-grams comprised of the multiple N-gram levels include N-grams of at least two different N-gram sizes.

17. The method of claim 16, wherein an N-gram size for an N-gram of the plurality of N-grams includes at least one of: a unigram, a bigram, a trigram, a quadgram, and a pentagram.

18. The method of claim 14, wherein the new text is comprised of a plurality of words, each N-gram represents a different combination of one or more words from the plurality of words, and each N-gram of a different N-gram size represents a different number of the one or more words.

19. The method of claim 14, wherein building the plurality of N-grams comprises:
generating a vector representation of the new text; and
building the plurality of N-grams comprised of the multiple N-gram levels based on the vector representation.

20. The method of claim 14, wherein analyzing the new text using the multiple N-gram levels in conjunction with the training data to generate the subset of classes comprises:
passing each N-gram through a convolution layer comprising an activation function, wherein the activation function learns a weight matrix of each N-gram and produces an output feature vector for each N-gram;
passing the output feature vector for each N-gram through a max pooling layer to form a one-dimensional feature vector; and
passing the one-dimensional feature vector through a loss layer comprising a softmax function to yield the subset of classes.

* * * * *